H. D. STRAIGHT.
PLOW.
No. 173,869.
Patented Feb. 22, 1876.
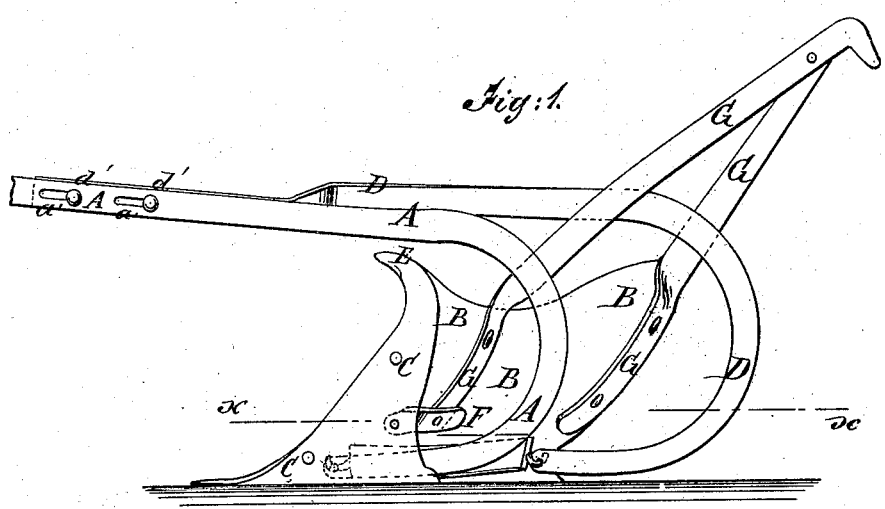
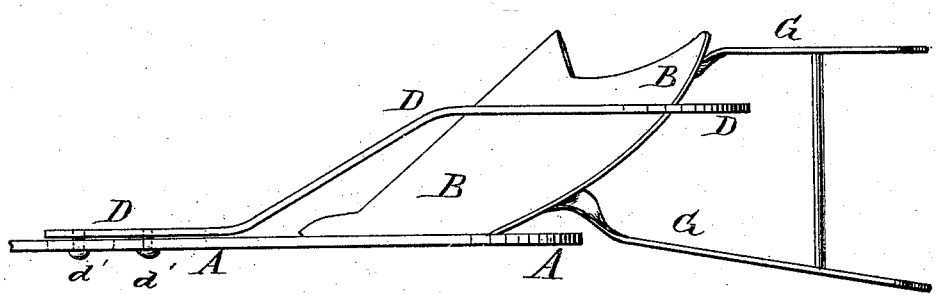
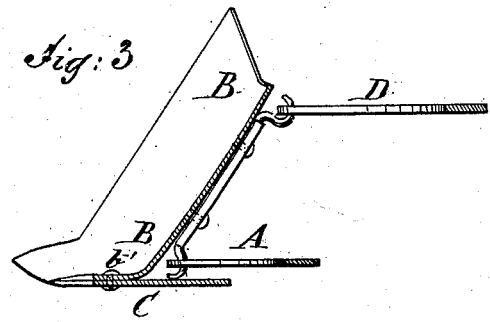
WITNESSES:
Chas. Niola
Alex F. Roberts
INVENTOR:
H. D. Straight
BY
ATTORNEYS.

UNITED STATES PATENT OFFICE.

HENRY D. STRAIGHT, OF DENMARK, IOWA.

IMPROVEMENT IN PLOWS.

Specification forming part of Letters Patent No. 173,869, dated February 22, 1876; application filed November 27, 1875.

*To all whom it may concern:*

Be it known that I, HENRY D. STRAIGHT, of Denmark, Lee county, Iowa, have invented a new and useful Improvement in Plows, of which the following is a specification:

Figure 1 is a side view of my improved plow. Fig. 2 is a top view of the same; and Fig. 3 is a horizontal section of the same taken through the line $x\ x$, Fig. 1.

Similar letters of reference indicate corresponding parts.

The object of this invention is to furnish an improved plow, simple in construction, and convenient in use, and which shall be so constructed that the depth at which it works in the ground may be controlled entirely by the handles.

The invention will first be described in connection with drawing, and then pointed out in the claims.

A is the beam, the rear end of which is curved downward and is hinged to the forward part of the mold-board B near the land-side C by means of a lug, bar, or other pivot formed upon or attached to said mold-board B. D is a brace, the rear end of which is curved downward, and is hinged to the outer forward part of the mold-board B by means or a lug, bar, or other pivot formed upon or attached to the said mold-board. The inner or land-side part $b'$ of the mold-board B is bent forward to serve as a colter to cut the soil, instead of tearing it apart, as an ordinary plow does, and is bolted or riveted to the forward edge of the land-side C. The land-side C is made short, extending no farther back than the shear, and is made high, its upper end rising above the upper edge of the mold-board, and having a forwardly-projecting hook, E, formed upon it to prevent trash from passing over said upper end to the rear of the plow. The connection between the mold-board B and the land-side C is strengthened by one or more braces, F. The brace D is bent inward and then forward, so that its forward part may extend along the side of beam A, to which it is secured by bolts $d'$ that pass through it and through short longitudinal slots $a'$ in the beam A, so that by moving the said brace forward or backward the plow may be adjusted to take or leave land, as may be desired. G are the handles, which are bolted or riveted to the hinged mold-board B, so that the said mold-board may be adjusted to enter the ground to any desired depth by said handles G.

Having thus described my invention, I claim as new and desire to secure by Letters Patent—

1. The land-side plate C, made high and short, as shown, and with a forwardly-projecting hook-shaped cutter E, as and for the purpose described.

2. The combination, with the described land-side plate C, of the mold-board B, curved forward at its front edge to form the colter of plow, as set forth.

3. The brace D, secured adjustably to the plow-beam A, and having its rear end curved downward and hinged to the mold-board B, substantially as herein shown and described.

HENRY D. STRAIGHT.

Witnesses:
T. W. ENSLOW,
R. J. SMITH.